(12) United States Patent
Bartholomew

(10) Patent No.: US 7,963,044 B1
(45) Date of Patent: Jun. 21, 2011

(54) MODULAR CONSTRUCTION LEVEL

(76) Inventor: Shown B. Bartholomew, Toronto (CA)

( * ) Notice: Subject to any disclaimer, the term of this patent is extended or adjusted under 35 U.S.C. 154(b) by 287 days.

(21) Appl. No.: 12/286,572

(22) Filed: Oct. 1, 2008

(51) Int. Cl.
*G01C 9/20* (2006.01)

(52) U.S. Cl. ............................................. 33/374; 33/383

(58) Field of Classification Search .................. 33/374, 33/347, 365, 370–371, 379, 381–385
See application file for complete search history.

(56) References Cited

U.S. PATENT DOCUMENTS

| | | | | |
|---|---|---|---|---|
| 1,670,432 A | * | 5/1928 | Baldon | 403/102 |
| 4,590,682 A | * | 5/1986 | Koch | 33/383 |
| 4,593,475 A | | 6/1986 | Mayes | |
| 6,029,360 A | * | 2/2000 | Koch | 33/382 |
| 6,205,669 B1 | | 3/2001 | Sollars et al. | |
| 6,643,942 B1 | * | 11/2003 | Russell | 33/459 |
| 6,658,752 B1 | * | 12/2003 | Bonaventura, Jr. | 33/374 |
| 6,829,837 B2 | | 12/2004 | Williams | |
| 6,834,435 B2 | | 12/2004 | Turner | |
| 6,839,974 B1 | | 1/2005 | Hitchcock | |
| 6,996,911 B1 | | 2/2006 | Dinius | |
| 7,089,676 B2 | | 8/2006 | Godinez | |
| 7,137,209 B2 | | 11/2006 | Northern et al. | |
| 7,162,805 B2 | | 1/2007 | Vick | |
| 7,562,463 B2 | * | 7/2009 | Vaes | 33/374 |

\* cited by examiner

*Primary Examiner* — G. Bradley Bennett
*Assistant Examiner* — Tania C Courson
(74) *Attorney, Agent, or Firm* — Montgomery Patent and Design; Robert C. Montgomery

(57) ABSTRACT

A construction level with modular detachable sections is herein disclosed. In its detached state, the level resembles a conventional two-foot level with the typical three bubble vials indicating levelness at angles of zero degrees (0°), forty-five degrees (45°), and ninety degrees (90°). If levelness over a larger distance is required, one (1) or both detachable end portions of the level are attached using sliding joints thus allowing the device to extend to a four (4) foot length. The attaching joints allow for the extension without a loss of accuracy. Each end piece has its own bubble vial to verify levelness at any point along the device. In such a manner, the device may also be used as a one-foot torpedo level. The use of the modular construction level allows for the accuracy and precision of a long level with the convenience and usability of a shorter level.

20 Claims, 5 Drawing Sheets

MODULAR CONSTRUCTION LEVEL

RELATED APPLICATIONS

The present invention was first described in a notarized Official Record of Invention on Jan. 30, 2007, that is on file at the offices of Montgomery Patent and Design, LLC, the entire disclosures of which are incorporated herein by reference.

FIELD OF THE INVENTION

The present invention relates generally to a construction level and, more particularly, to a construction level with modular detachable sections resembling a conventional two (2) foot level in its detached state and, when levelness over a larger distance is required, one (1) or both detachable end portions of the level are attached using sliding joints, thereby extending the level to a four (4) foot length.

BACKGROUND OF THE INVENTION

Construction and wood working projects require a variety of tools and accessories in order to ensure proper measurements for sizing pieces prior to performing cuts and/or assembly. As a result, there are a variety of core or base tools that are required when performing virtually any physical task. One of the most common tools used in such tasks is the common level. It is used to ensure objects are installed or constructed in a perfectly flat and/or upright manner. The common level is available in many lengths from a short torpedo level to ones four (4) feet or longer. The longer levels are more accurate, as they determine levelness over a wider area, but often do not fit into small areas and they are more cumbersome to transport and store. The smaller ones are easier to store and use, but the user is often forced to use a piece of wood or other material to span longer distances, thus affecting precision. Accordingly, there exists a need for a means by which the convenience of a short level can be combined with the precision of a longer level in a device that is easy and effective to use. The development of the present invention fulfills this need.

The present invention is a construction level with modular detachable sections resembling a conventional two (2) foot level in its detached state and when levelness over a larger distance is required one (1) or both detachable end portions of the level are attached using sliding joints extending the level to a four (4) foot length. The present invention comprises a body, a plurality of slide connection means, and a plurality of bubble level vials. The body is in the form of a bar, preferably rectangular, that is composed of at least three (3) sections: a first side section, a center section, and a second side section. Furthermore, the body is envisioned to comprise four (4) sides: a bottom side, a top side, a right side, and a left side. The first side section, the second side section, and the center section are envisioned to house at least three (3) bubble level vials adapted for zero (0) degree, forty-five (45) degree, and ninety (90) degree angles. A first bubble level vial is installed along the vertical axis, a second bubble level vial is installed along the horizontal axis, and a third bubble level vial is installed at a forty-five (45) degree angle on each the first side section, the second side section, and the center section. However, a greater or lesser number of bubble vials may be incorporated dependent on the length and/or potential use of the apparatus oriented at various angles thereof. The bubble vials are conventional bubble level vials found in most level tools and filled with a liquid such as ether, alcohol, or a mixture thereof. An air bubble is envisioned to be entrained in said vials to be utilized to level the working surface by positioning therebetween centerlines. It is envisioned the top side of the body will comprise windows so that the vials may be viewed therefrom. Furthermore, the bottom side of the body will comprise magnets to allow the level to be releasably attached to a metallic surface. The use of the present invention allows for the accuracy and precision of a long level with the convenience and usability of a short level.

Several attempts have been made in the past to provide improved levels. U.S. Pat. No. 7,137,209, issued in the name of Northern et al., describes a level and protractor tool for accurately measuring an angle of a surface and aiding in bending any object at the correct angle. Unlike the present invention, the Northern device does not disclose a level having modular detachable level sections.

U.S. Pat. No. 7,089,676, issued in the name of Godinez, discloses an attaching level provided with magnets spaced along the length of the level for helping to secure the level to metal objects. However, the Godinez device serves a different purpose then the present invention and does not allow a user the convenience of a short level and the precision of a longer level in a single device.

U.S. Pat. No. 6,996,911, issued in the name of Dinius, discloses a combination level and squaring tool providing a squaring, leveling, and holding function for pipe-fitting applications. Unlike the present invention, the Dinius device does not disclose a level having modular detachable level sections.

U.S. Pat. No. 6,839,974, issued in the name of Hitchcock, discloses a multi-function layout square with laser that has a protractor plate and when the protractor plate is removed the casing may be used as a level, a plumb bob, a ruler, and a compass. However, the Hitchcock device does not disclose a level having modular detachable level sections.

U.S. Pat. No. 6,834,435, issued in the name of Turner, discloses a device for properly positioning conduit piping that includes leveling and positioning components. However, the Turner device is a level that enables simultaneous positioning of multiple angles and does not disclose modular detachable sections.

U.S. Pat. No. 6,205,669, issued in the name of Sollars et al., discloses a wall hanging level for determining whether a wall hanging is horizontally aligned properly on a vertical wall surface. However, the Sollars device does not disclose a level having modular detachable level sections.

U.S. Pat. No. 4,593,475, issued in the name of Mayes, discloses a level with a slotted magnet support which allows a user to take their hands off the level when it is in a correct position. However, unlike the present invention, the Mayes device does not disclose a level having modular detachable level sections.

None of the prior art particularly describes a construction level with modular detachable sections resembling a conventional two (2) foot level in its detached state and when levelness over a larger distance is required one (1) or both detachable end portions of the level are attached using sliding joints extending the level to a four (4) foot length. Accordingly, there exists a need for a means by which the convenience of a short level can be combined with the precision of a longer level in a device that is easy and effective to use that operates without the disadvantages as described above.

SUMMARY OF THE INVENTION

In view of the foregoing disadvantages inherent in the prior art, it has been observed that there is need for a construction level by which the convenience of a short construction level can be combined with the precision of a longer level in a device that is easy and effective to use.

To achieve the above objectives, it is an object of the present invention to provide a construction level comprising a body, a plurality of slide connection means, a center section, a first side section, and a second side section.

A further object of the present invention is having the body comprising a bottom side, a top side, a right side, and a left side wherein the bottom side is parallel to the top side and the right side is parallel to the left side and the right side and the left side perpendicularly intersect the bottom side and the top side.

Another object of the present invention is having the plurality of slide connection means further comprising a first male portion, a second male portion, a first female portion, and a second female portion, wherein the first male portion is releasably engagable with the first female portion and the second male portion is releasably engagable with the second female portion.

Yet another object of the present invention is having the body further comprising the center section housing at least one (1) bubble level vial having the first female portion on the right side and the second female portion on the left side, the first side section housing at least one (1) bubble level vial having the first male portion located on a first side parallel with the right side and the left side and being releasably attachable to the center section, and the second side section housing at least one (1) bubble level vial having the second male portion located on a second side parallel with the right side and the left side and being releasably attachable to the center section.

Still yet another object of the present invention is having the center section two (2) feet in length.

Still yet another object of the present invention is having the first side section one (1) foot in length.

Yet still another object of the present invention is having the second side section one (1) foot in length.

Still another object of the present invention is having the level further comprise a plurality of centerlines located on an outside surface of the bubble level vials and an air bubble contained inside the bubble level vials, wherein the air bubble is utilized to indicate a level working surface by positioning the air bubble between the plurality of centerlines.

Still yet another object of the present invention is having the level further comprise a plurality of windows located on the top side of the body allowing the bubble level vials to be viewed therethrough the window.

Yet another object of the present invention is having the level further comprise the center section containing a first bubble level vial, a second bubble level vial, and a third bubble level vial located therein the center section, wherein the first bubble level vial is positioned along a vertical axis, the second bubble level vial is positioned along a horizontal axis, the third bubble level vial is positioned at a forty-five degree (45°) angle, and the center section having a plurality of positioned openings located coaxially to the first bubble level vial, the second bubble level vial, and the third bubble level vial for receiving, securing, and displaying the first bubble level vial, the second bubble level vial, and the third bubble level vial.

Still yet another object of the present invention is having the level further comprise the first side section containing a first bubble level vial, a second bubble level vial, and a third bubble level vial located therein the first side section, wherein the first bubble level vial is positioned along a vertical axis, the second bubble level vial is positioned along a horizontal axis, the third bubble level vial is positioned at a forty-five degree (45°) angle, and the first side section having a plurality of positioned openings located coaxially to the first bubble level vial, the second bubble level vial, and the third bubble level vial for receiving, securing, and displaying the first bubble level vial, the second bubble level vial, and the third bubble level vial.

Still yet another object of the present invention is having the level further comprise the second side section containing a first bubble level vial, a second bubble level vial, and a third bubble level vial located therein the second side section, wherein the first bubble level vial is positioned along a vertical axis, the second bubble level vial is positioned along a horizontal axis, the third bubble level vial is positioned forty-five degree (45°) angle, and the second side section having a plurality of positioned openings located coaxially to the first bubble level vial, the second bubble level vial, and the third bubble level vial for receiving, securing, and displaying the first bubble level vial, the second bubble level vial, and the third bubble level vial.

Yet still another object of the present invention is having the first side section releasably attachable to the center section such that the first side section provides a lateral continuation of a profile portion of the center section.

Still another object of the present invention is having the second side section releasably attachable to the center section such that the second side section provides a lateral continuation of a profile portion of the center section.

Still yet another object of the present invention is having the level further comprise a plurality of magnets interposed therewithin the bottom side of the body so an exposed portion of the plurality of magnets is flush with the bottom side of the body at which it is integrated thereto, wherein the plurality of magnets allow the level to be releasably engaged thereto a metallic surface.

Yet another object of the present invention is having the level further comprise a series of evenly spaced indicia which extend along an entire or partial length of the body to define a scale in metric and/or English units with a series of corresponding numerical indicia thereon, wherein the indicia can be utilized to measure distances.

Yet another object of the present invention is having the bubble level vials filled with a liquid such as ether, alcohol, or a mixture thereof.

Yet another object of the present invention is having the level further comprise the first side section being releasably attachable to the center section by a variety of snug and non-rotating linear sliding designs including a dove-tail, a keyhole, a "T"-shape, or similar means and the second side section being releasably attachable to the center section by a variety of snug and non-rotating linear sliding designs including a dove-tail, a keyhole, a "T"-shape, or similar means.

Yet another object of the present invention is having the level further comprise the first side section having a hinged and foldable first side intermittently rotating backwards separating at designated degrees starting with zero degrees (0°) and ending at one hundred-eighty degrees (180°) separated by fifteen degree (15°) intervals and the second side section having a hinged and foldable second side intermittently rotating backwards separating at designated degrees starting with zero degrees (0°) and ending at one hundred-eighty degrees (180°) separated by fifteen degree (15°) intervals.

Yet another object of the present invention is providing a method for using the present invention to provide the convenience of a short level combined with the precision of a longer level in a device that is easy and effective to use.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
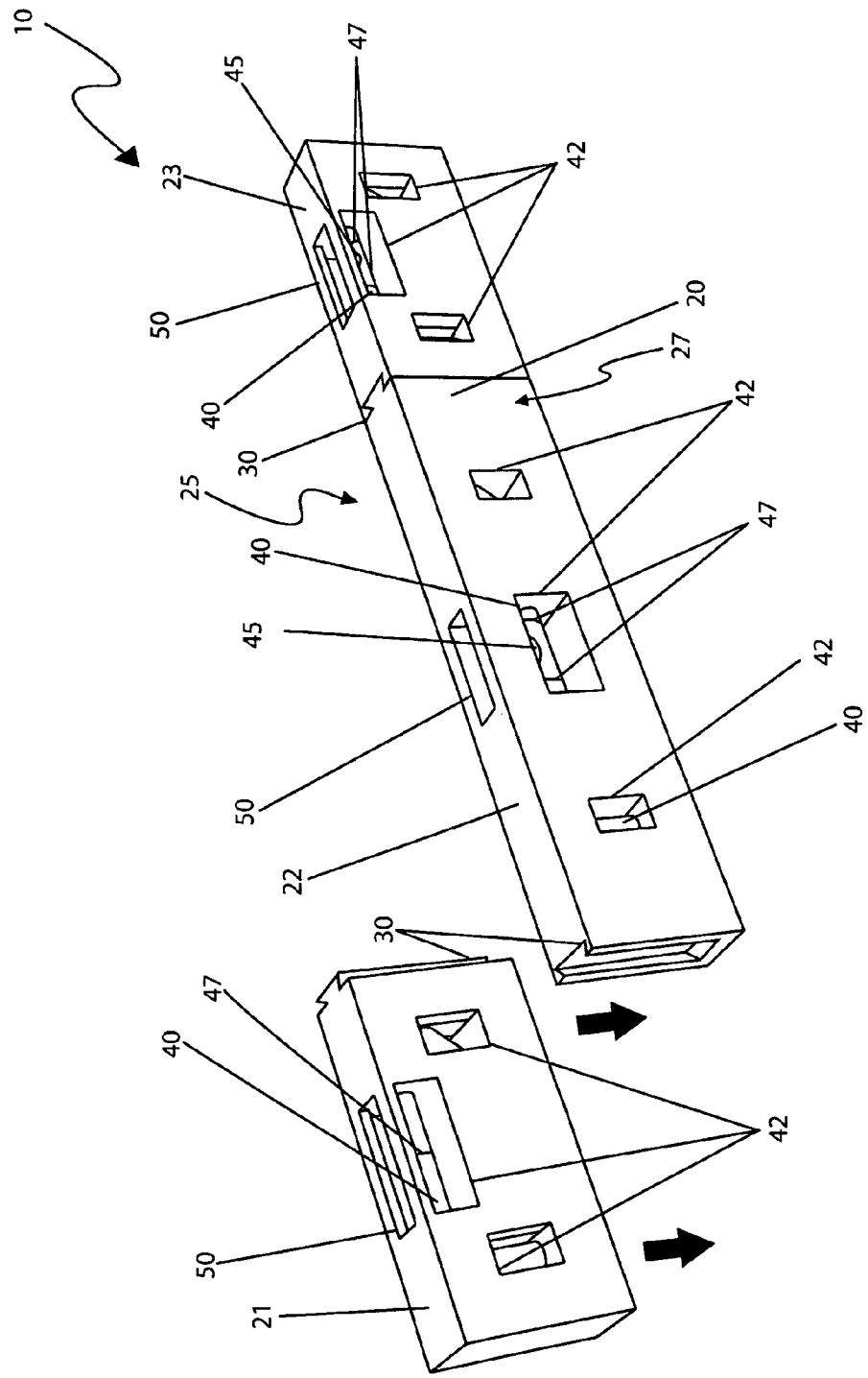
FIG. 1 is a top perspective view of a modular construction level 10, according to the preferred embodiment of the present invention.

10 modular construction level body
21 first side section
22 center section
23 second side section
24 bottom side top side
26 right side
27 left side
30 slide
40 bubble vial
42 vial opening
45 air bubble
47 centerline
50 window
55 indicia
60 magnet

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a construction level having modularly connected extension sections 21, 23 that may be selectively extended or retracted as desired. The modular construction level (herein described as the "device") 10 comprises a body 20, slides 30, and a plurality of bubble vials 40. The device 10 is envisioned to be introduced in a plurality of sizes to accommodate the utilization for a plurality of construction sites of various intricacies and/or magnitudes, but is preferably of a size which may conveniently be detached and carried in a pouch, pocket, and/or other carrying device. The device 10 is envisioned to be fabricated of any suitable material such as molded or sheet plastics of various types and/or metals such as aluminum, if desired.

Figure 2:
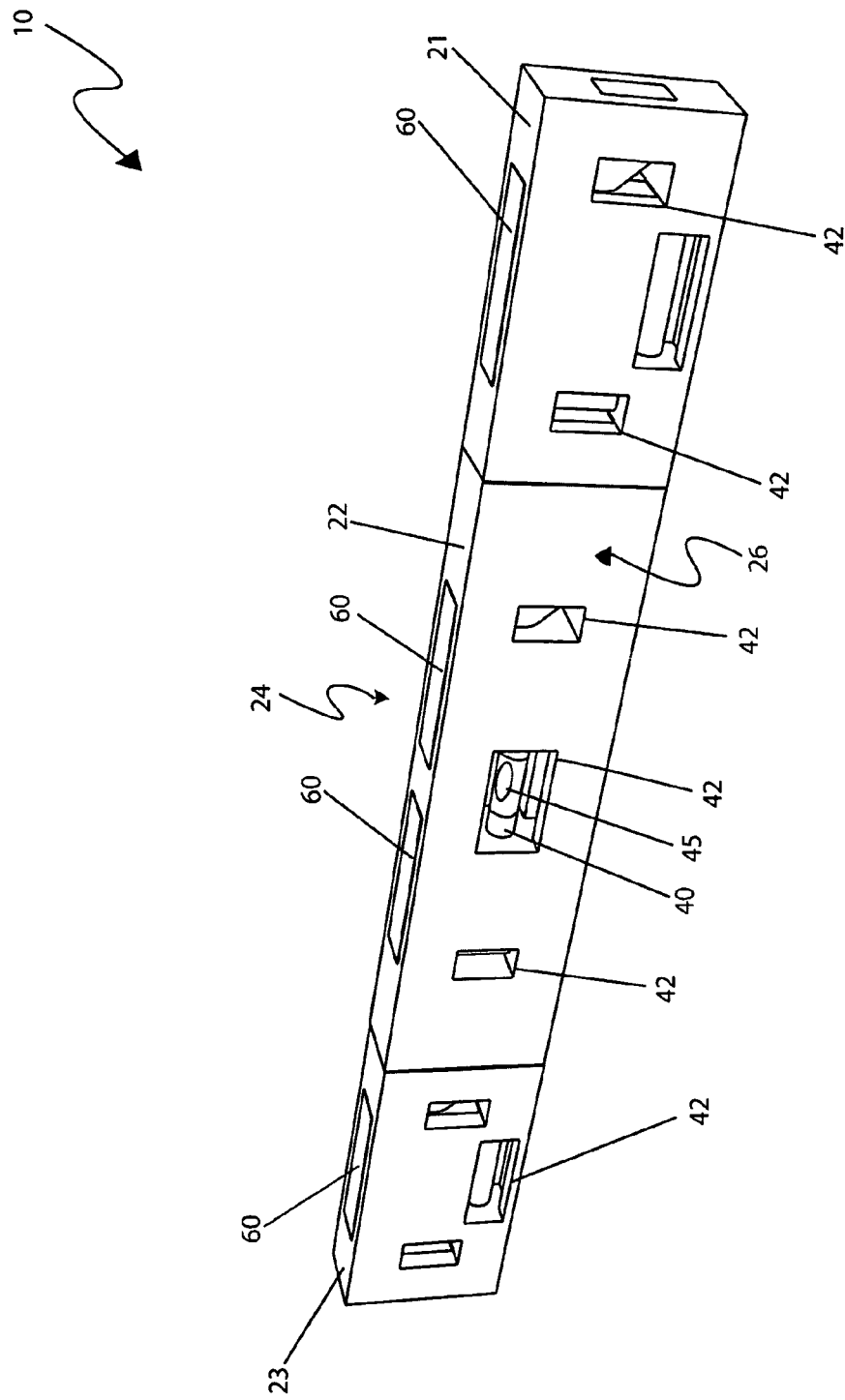
FIG. 2 is a bottom perspective view of the modular construction level 10, according to the preferred embodiment of the present invention.
Figure 3:
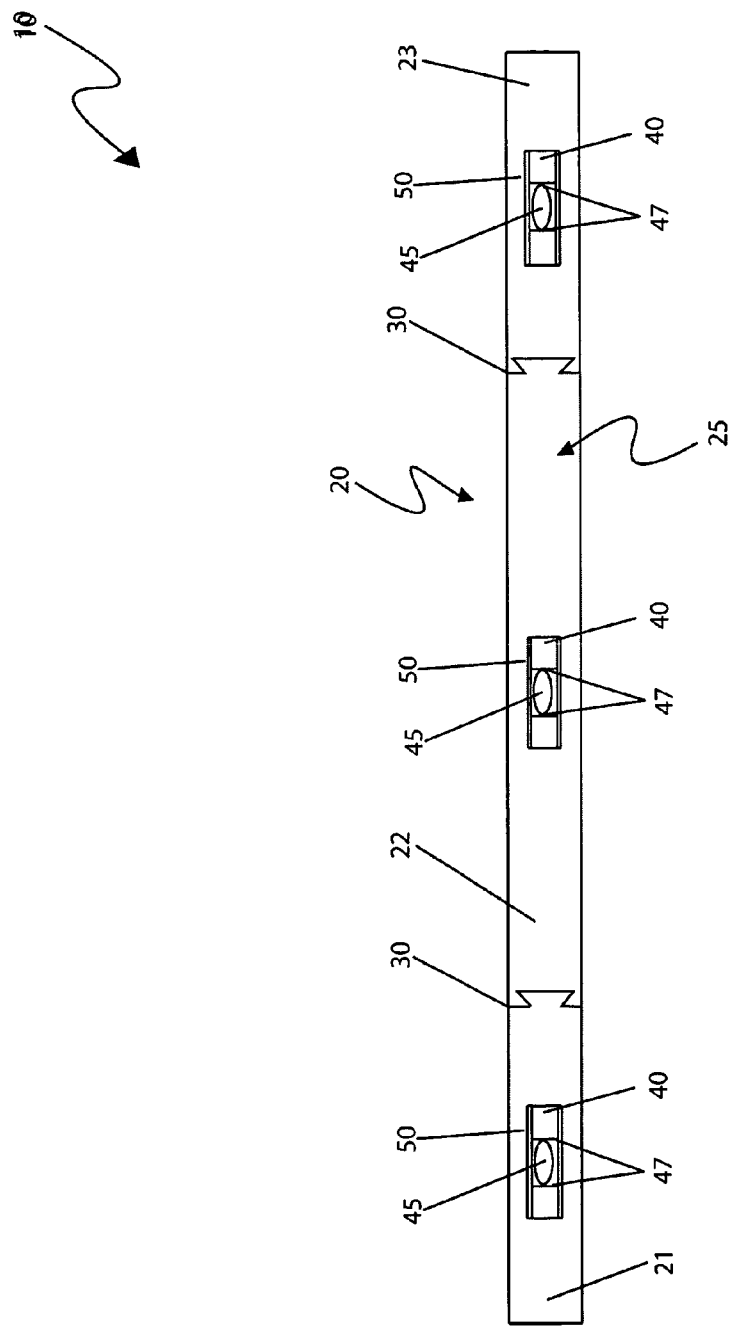
FIG. 3 is a top view of the modular construction level 10, according to the preferred embodiment of the present invention.

Referring now to FIGS. 1 and 2, perspective views of the device 10 are disclosed, in accordance with the preferred embodiment of the present invention. The device 10 is envisioned to comprise a body 20 in the form of a bar, preferably rectangular, that is composed of at least three (3) sections: a first side section 21, a center section 22, and a second side section 23. The body 20 is envisioned to comprise four (4) sides: a bottom side 24, a top side 25, a right side 26, and a left side 27. The bottom 24 and top 25 sides are in a parallel arrangement therewith for mounting on a desired surface to determine levelness, which are intersected by two (2) perpendicular sides 26, 27. The body 20 is envisioned to be introduced in a plurality of sizes, but is preferably four (4) feet in length sized between the three (3) sections 21, 22, 23. The center section 22 is envisioned to be two (2) feet in length while the first 21 and second 23 side sections are one (1) foot each. Each section 21, 22, 23 is envisioned to house at least three (3) bubble level vials 40 adapted for zero degree (0°), forty-five degree (45°), and ninety degree (90°) angles. A first bubble level vial 40 is installed along the vertical axis, a second bubble level vial 40 is installed along the horizontal axis, and a third bubble level vial 40 is installed at a forty-five degree (45°) angle on each section 21, 22, 23. It should be noted however, that a greater (or lesser) number of bubble vials 40 may be incorporated dependent on the length and/or potential use of the device 10 oriented at various angles thereof. The vials 40 are envisioned to be integrated therein the center of the right side 26 and left side 27 of the body 20. The right side 26 and left side 27 of the body 20 are provided with coaxially positioned openings 42 to receive, secure, and display level-indicating vials 40. The bubble vials 40 are conventional bubble level vials found in most level tools and filled with a liquid such as ether, alcohol, or a mixture thereof. An air bubble 45 is envisioned to be entrained in said vials 40 to be utilized to level the working surface by positioning therebetween centerlines 47. It is envisioned the top side 25 of the body 20 will comprise windows 50 or viewing ports so that the vials 40 may be viewed from a top side view, as depicted in FIG. 3. Alternatively, the bottom side 24 may comprise windows 50 in addition to the top side 25 of the body 20.

Figure 4:
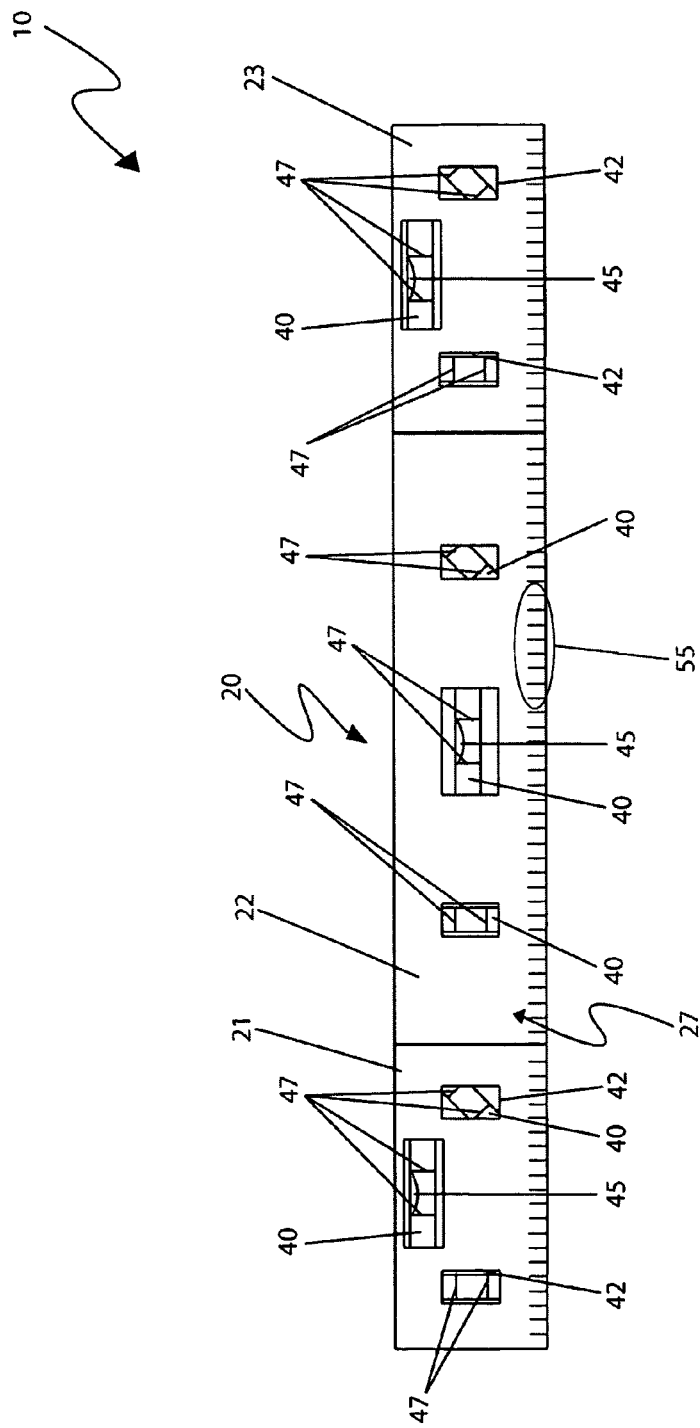
FIG. 4 is a front view of the modular construction level 10, according to the preferred embodiment of the present invention; and, FIG. 5 is a side view of the modular construction level, according to the preferred embodiment of the present invention.
Figure 5:
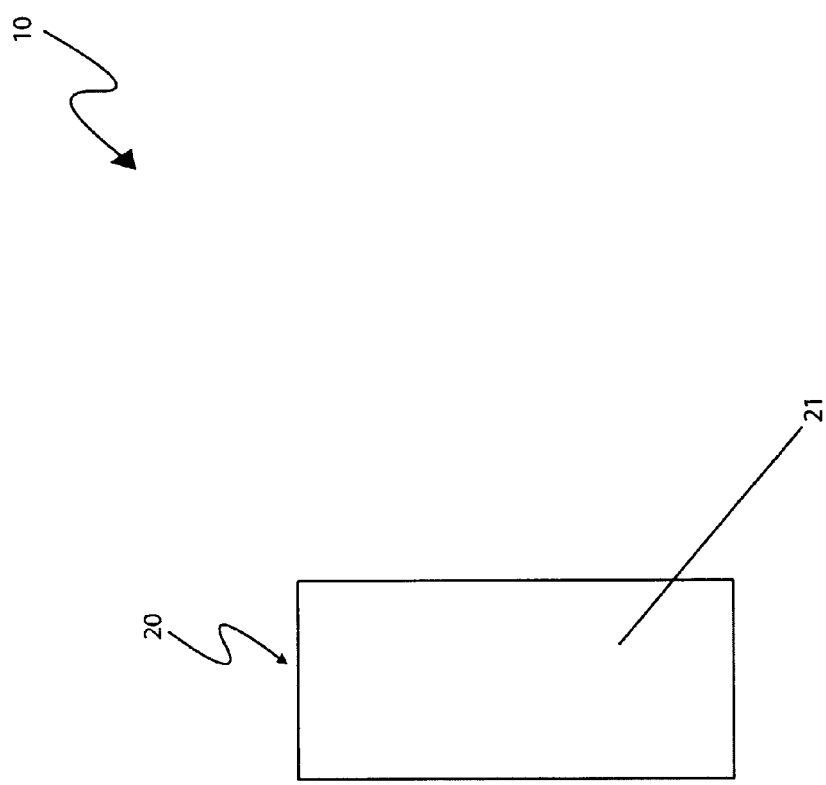

Referring now to FIGS. 3 through 5, various views of the device 10 are disclosed in accordance with the preferred embodiment of the present invention. The device 10 is of modular construction and includes two (2) side sections 21, 23 being slidingly attached thereto the center section 22 by vertical slides 30 such that said side sections 21, 23 are capable of being snuggly joined thereto the center section 22. The side sections 21, 23 are affixed thereto the center section 22 along a top surface via downward engagement of mating slide portions 30 until a male portion is fully engaged therein mating female portions of said slides 30. It will be appreciated that said slide portions 30 may comprise a variety of snug and non-rotating linear sliding designs such as a dove-tail, a keyhole, a "T"-shape, or the like without leaving the scope of the invention. The slides 30 are mechanically attached thereto the center section 22 and each side section 21, 23 via suitable fasteners thereof, enabling said side sections 21, 23 to be slidingly affixed to said center section 22. The slides 30 provide a mating feature such that the side sections 21, 23 may provide a lateral continuation of a profile portion of the center section 22.

The body 20 is envisioned to comprise magnets 60 interposed therewithin a cavity, recesses, or the like so the exposed surface of said magnets 60 are flush with the respective body surface 20 at which it is integrated thereto. The magnets 60 are envisioned to be utilized to facilitate to the attaching to a desired surface at which is being measured for leveling. The magnets 60 are envisioned to comprise a desired magnetism to forcibly engage the metallic surface at which the device 10 may be releasably engaged thereto. Thus, the device 10 may be attached to the desired working surface hands-free for better viewing, scribing, and/or the like. Due to the rectangular nature of the bottom 24 and top 25 side of the body 20 and the presence of the magnets 60 on said bottom 24 and top 25 sides, at least one (1) contact surface comprises a secure non-sliding grip. Whenever so desired, one (1) or both side sections 21, 23 may be slidingly released 30 therefrom the center section 22 thereby allowing the device 10 to be at a length of two (2) feet.

An alternate embodiment of the present invention may disclose the body 20 comprising a series of evenly spaced indicia 55 which extend along the entire or partial length of said body 20 to define a scale in metric and/or English units with corresponding numerical indicia 55 thereon which can be utilized to measure distances.

Another alternate embodiment of the present invention may disclose hinged and foldable side sections 21, 23 intermittently rotating backwards separating at designated degrees starting with zero (0°) degrees and ending at one hundred-eighty degrees (180°) separated by fifteen degree (15°) intervals, for example. It will be appreciative that alternate intervals may be used.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. The present invention describes a means by which a modular level may provide sections 21, 23 to be added thereto or subtracted therefrom as desired to be utilized for levelling surfaces of various sizes, easy transportation, and/or for convenient storage means in the most efficient manner. After initial purchase or acquisition of the device 10, it would be configured as indicated in FIGS. 1 through 5.

The method of utilizing the device 10 may be achieved by performing the following steps: engaging the side sections 21, 23 using the slides 30 thereby engaging thereto the sides of the center section 22, to provide a desired length; mounting the device 10 onto the desired surface to be leveled; engaging the magnets 60 onto the desired surface, if said surface is metallic in nature; viewing the leveling bubble vials 40; motioning the desired surface until the bubble 45 residing therewithin said bubble vials 40 is positioned between the two (2) centerlines 47; and, detaching one (1) or more side sections 21, 23 thereby separating the device 10 into a plurality of sections 21, 22, 23.

In the detached orientation, the center section 22 of the device 10 resembles a conventional two (2) foot level with the three (3) bubble vials 40 indicating levelness at angles of zero degrees (0°), forty-five degrees (45°), and ninety degrees (90°). If levelness over a larger distance is required, either or both side sections 21, 23 of the device 10 may be affixed about the vertical axis of the slides 30. The side portions 21, 23 are each one (1) foot long thus allowing the device 10 to extend to a total of four (4) feet in length. Each side section 21, 23 has three (3) bubble vials 40 to verify levelness at any point along the device 10. In such a manner, the device 10 may also be used as a one (1) foot torpedo level.

The device 10 may be utilized on a plurality of surfaces of objects fabricated of a plurality of materials. However, it is more beneficial to utilize the device 10 on magnetically attractive surfaces so that the magnets 60 integrated therewith the body 20' may be utilized to releasably engage thereto said magnetic surface. In use, the device 10 is designed for determining whether a surface is horizontally, vertically, or angularly level. Windows 50 are integrally placed on the top side 25 of the body 20 that overlie the bubble vials 40 to view and allow said vials 40 to be viewed from a top side view.

The bottom 24 and/or the top 25 side of the body 20 preferably includes at least one (1) magnet 60, most preferably three (3), for use in attaching to metallic surfaces to hold the device 10 in place. Advantageously, where a metallic surface is being measured, the magnets 60 provide a means of attachment, without regard to the effects of gravity on the device 10. The magnets 60 are flush with the surface at which said magnets 60 are integrated thereto to allow attachment thereto with accuracy. Detachment of the side sections 21, 23 of the device 10 may be utilized for measuring of small surfaces, easy transportation, and/or convenient storage thereof.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A construction level, comprising:
    a body comprising a bottom side, a top side, a right side, and a left side, wherein said bottom side is parallel to said top side and said right side is parallel to said left side and said right side and said left side perpendicularly intersect said bottom side and said top side;
    a plurality of slide connection means comprising:
        a first male portion;
        a second male portion;
        a first female portion releasably engagable with said first male portion; and,
        a second female portion releasably engagable with said second male portion;
    a center section having said first female portion on said right side and said second female portion on said left side;
    a first side section having said first male portion located on a first side parallel with said right side and said left side and being releasably attachable to said center section;
    a second side section having said second male portion located on a second side parallel with said right side and said left side and being releasably attachable to said center section; and,
    wherein said first side section, said center section, and said second side section each house at least one (1) bubble level vial.

2. The level of claim 1, wherein said center section is two (2) feet in length.

3. The level of claim 2, wherein said first side section is one (1) foot in length.

4. The level of claim 3, wherein said second side section is one (1) foot in length.

5. The level of claim 1, wherein said level further comprises:
- a plurality of centerlines located on an outside surface of each of said bubble level vials; and,
- an air bubble contained inside each of said bubble level vials, wherein said air bubble is utilized to indicate a level working surface by positioning said air bubble between said plurality of centerlines.

6. The level of claim 1, wherein said level further comprises a plurality of windows located on said top side of said body, thereby allowing each of said bubble level vials to be viewed therethrough said window.

7. The level of claim 1, wherein said level further comprises:
- said center section containing a first bubble level vial, a second bubble level vial, and a third bubble level vial located therein said center section;
- said first bubble level vial is positioned along a vertical axis;
- said second bubble level vial is positioned along a horizontal axis;
- said third bubble level vial is positioned at a forty-five (45) degree angle; and,
- said center section having a plurality of positioned openings located coaxially to said first bubble level vial, said second bubble level vial, and said third bubble level vial for receiving, securing, and displaying said first bubble level vial, said second bubble level vial, and said third bubble level vial.

8. The level of claim 1, wherein said level further comprises:
- said first side section containing a first bubble level vial, a second bubble level vial, and a third bubble level vial located therein said first side section;
- said first bubble level vial is positioned along a vertical axis;
- said second bubble level vial is positioned along a horizontal axis;
- said third bubble level vial is positioned at a forty-five degree (45°) angle; and,
- said first side section having a plurality of positioned openings located coaxially to said first bubble level vial, said second bubble level vial, and said third bubble level vial for receiving, securing, and displaying said first bubble level vial, said second bubble level vial, and said third bubble level vial.

9. The level of claim 1, wherein said level further comprises:
- said second side section containing a first bubble level vial, a second bubble level vial, and a third bubble level vial located therein said second side section;
- said first bubble level vial is positioned along a vertical axis;
- said second bubble level vial is positioned along a horizontal axis;
- said third bubble level vial is positioned at a forty-five degree (45°) angle; and,
- said second side section having a plurality of positioned openings located coaxially to said first bubble level vial, said second bubble level vial, and said third bubble level vial for receiving, securing, and displaying said first bubble level vial, said second bubble level vial, and said third bubble level vial.

10. The level of claim 1, wherein said first side section is releasably attachable to said center section such that said first side section provides a lateral continuation of a profile portion of said center section.

11. The level of claim 10, wherein said second side section is releasably attachable to said center section such that said second side section provides a lateral continuation of said profile portion of said center section.

12. The level of claim 1, wherein said level further comprises a plurality of magnets interposed therewithin said bottom side of said body so an exposed portion of said plurality of magnets is flush with said bottom side of said body at which it is integrated thereto, thereby said plurality of magnets allow said level to be releasably engaged thereto a metallic surface.

13. The level of claim 1, wherein said level further comprises a series of evenly spaced indicia which extend along an entire or partial length of said body to define a scale in metric and/or English units with a series of corresponding numerical indicia thereon, wherein said indicia can be utilized to measure distances.

14. The level of claim 1, wherein each of said bubble level vials are filled with a liquid such as ether, alcohol, or a mixture thereof.

15. The level of claim 1, wherein said level further comprises:
- said first side section is releasably attachable to said center section by a variety of snug and non-rotating linear sliding designs comprising one (1) of the following list: a dove-tail, a keyhole, a "T"-shape, or similar means; and,
- said second side section is releasably attachable to said center section by a variety of snug and non-rotating linear sliding designs comprising one (1) of the following list: a dove-tail, a keyhole, a "T"-shape, or similar means.

16. The level of claim 13, wherein said level further comprises:
- said first side section having a hinged and foldable first side intermittently rotating backwards separating at designated degrees, starting with zero degrees (0°), ending at one hundred-eighty degrees (180°), and separated by fifteen degree (15°) intervals; and,
- said second side section having a hinged and foldable second side intermittently rotating backwards separating at designated degrees, starting with zero degrees (0°), ending at one hundred-eighty degrees (180°), and separated by fifteen degree (15°) intervals.

17. A method for using a construction level, said method comprising the steps of:
- providing said construction level, comprising:
  - a body comprising a bottom side, a top side, a right side, and a left side, wherein said bottom side is parallel to said top side and said right side is parallel to said left side and said right side and said left side perpendicularly intersect said bottom side and said top side;
  - a plurality of slide connection means comprising:
    - a first male portion;
    - a second male portion;
    - a first female portion releasably engagable with said first male portion; and,
    - a second female portion releasably engagable with said second male portion;

a center section having said first female portion on said right side and said second female portion on said left side;

a first side section having said first male portion located on a first side parallel with said right side and said left side and being releasably attachable to said center section;

a second side section having said second male portion located on a second side parallel with said right side and said left side and being releasably attachable to said center section; and, wherein said first side section, said center section, and said second side section each house at least one (1) bubble level vial;

engaging said first side section and said second side section using said plurality of slide connection means thereby releasably engaging thereto said right side and said left side of said center section, to provide a desired length;

mounting said level onto a desired surface to be leveled;

engaging said plurality of magnets onto said desired surface, if said surface is metallic in nature;

viewing each of said bubble level vials; and, motioning said desired surface until said air bubble residing therewithin said bubble level vials is positioned between said plurality of centerlines.

18. The method of claim 17, further comprising the steps of:

detaching said first side section and/or said second side section thereby separating the body into a plurality of sections;

engaging said first side section and said second side section using said plurality of slide connection means thereby releasably engaging thereto said right side and said left side of said center section, to provide a desired length;

mounting said level onto a desired surface to be leveled;

engaging said plurality of magnets onto said desired surface, if said surface is metallic in nature;

viewing each of said bubble level vials; and, motioning said desired surface until said air bubble residing therewithin said bubble level vials is positioned between said plurality of centerlines.

19. A construction level, comprising:

a body comprising a bottom side, a top side, a right side, and a left side, wherein said bottom side is parallel to said top side and said right side is parallel to said left side and said right side and said left side perpendicularly intersect said bottom side and said top side;

a plurality of slide connection means comprising:
   a first male portion;
   a second male portion;
   a first female portion releasably engagable with said first male portion; and,
   a second female portion releasably engagable with said second male portion;

a center section having said first female portion on said right side and said second female portion on said left side, wherein said center section is two (2) feet in length;

a first side section having said first male portion located on a first side parallel with said right side and said left side and being releasably attachable to said center section, wherein said first side section is one (1) foot in length;

a second side section having said second male portion located on a second side parallel with said right side and said left side and being releasably attachable to said center section, wherein said second side section is one (1) foot in length; and, wherein said first side section, said center section, and said second side section each house at least one (1) bubble level vial.

20. The level of claim 19, wherein said level further comprises:

a plurality of centerlines located on an outside surface of each of said bubble level vials;

an air bubble contained inside each of said bubble level vials, wherein said air bubble is utilized to indicate a level working surface by positioning said air bubble between said plurality of centerlines; and, a plurality of windows located on said top side of said body allowing said bubble level vials to be viewed therethrough said window.

* * * * *